United States Patent [19]

Lombard

[11] 4,010,407
[45] Mar. 1, 1977

[54] ENERGY EXCHANGER FOR AN ELECTRICAL VEHICLE

[75] Inventor: Claude Lombard, Le Chesnay, France

[73] Assignee: Regie Nationale des Usines Renault, Boulogne-Billancourt, France

[22] Filed: Mar. 6, 1975

[21] Appl. No.: 556,113

[30] Foreign Application Priority Data

Mar. 7, 1974 France .............................. 74.07789

[52] U.S. Cl. ................................. 318/63; 318/87; 318/88; 320/62; 322/9; 318/139
[51] Int. Cl.² .......................................... H02P 3/00
[58] Field of Search ................ 318/139, 63, 87, 88; 320/61, 62; 322/9

[56] References Cited

UNITED STATES PATENTS

| | | | |
|---|---|---|---|
| 2,626,374 | 1/1953 | Baston | 318/63 |
| 3,530,356 | 9/1970 | Aronson | 320/61 |
| 3,546,548 | 12/1970 | Wouk | 318/139 |
| 3,630,304 | 12/1971 | Sahinkaya | 318/139 UX |
| 3,808,481 | 4/1974 | Rippel | 318/139 |
| 3,828,233 | 8/1974 | Brulard | 318/87 |
| 3,881,141 | 4/1975 | Narita | 318/87 |

*Primary Examiner*—Gene Z. Rubinson
*Attorney, Agent, or Firm*—Haseltine, Lake & Waters

[57] ABSTRACT

An energy exchanger for a battery driven vehicle comprising two rotatable electrical machines connected on the same shaft, one of high voltage, the other of low voltage. The electrical machines can each be operated in generator or motor modes and the machines are electrically connected together to the battery on a vehicle via an electrical control circuit such that the machines exchange energy between themselves and the battery, both to drive the vehicle by battery drain and to recharge the battery when the vehicle is decelerating. The battery can be recharged from an external power supply via the machines which then operate in generator mode.

6 Claims, 2 Drawing Figures

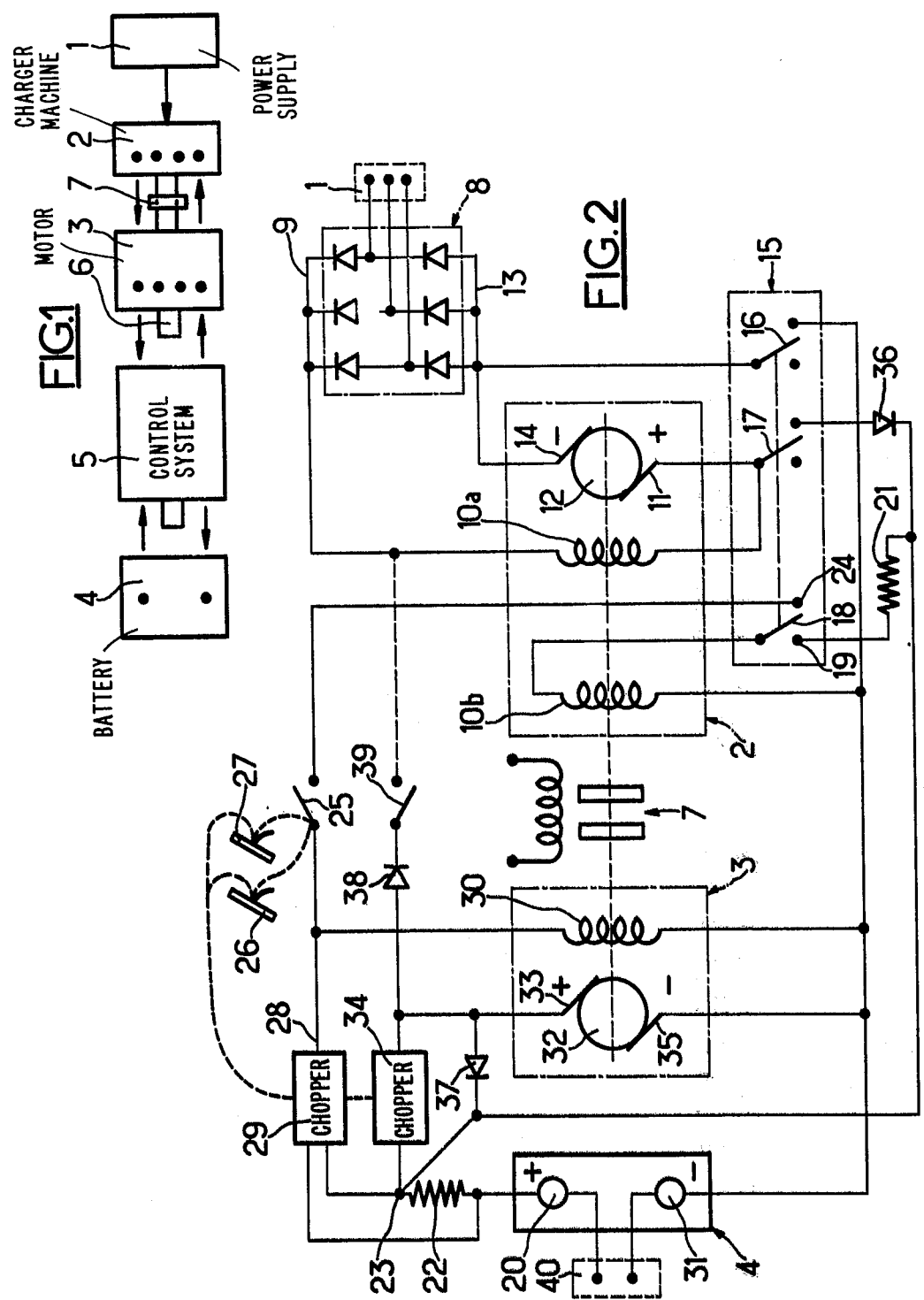

ENERGY EXCHANGER FOR AN ELECTRICAL VEHICLE

FIELD OF THE INVENTION

The present invention relates to an energy exchanger for an electric vehicle provided with a charger for the battery and a system for recovery of brakage energy.

BACKGROUND

Electric vehicles are generally provided with a charger for the total recharging of their batteries all together comprising a connector for distribution of electrical energy. This charger therefore preferably is adaptable to all types of available voltage sources.

However, each time that the vehicle slows down, its motor becomes a voltage generator and recharges the batteries with a part of the energy preceedingly accumulated by the vechicle in the form of kinetic energy. For reasons of convenience of driving and safety, there is initially a low recovery of energy when the operator releases the accelerator, which permits obtaining a motor brakage substantially identical to that obtained with internal combustion engines, this recovery of energy progressively increasing as the operator more vigorously activates the brake pedal.

When the speed of the vehicle is low, the electromotive force of the motor can be less than that of the batteries. It is therefore not possible to recover the kinetic energy of the vehicle. To avoid discharge of the batteries, the motor can be short circuited, in which case, at low speed, the kinetic energy of the vehicle for the charging of the batteries is lost.

To resolve this problem which is posed at low speeds, it has been proposed to mount on the motor shaft a small auxiliary generator delivering, for such speed, an electromotive voltage of much greater value than that furnished by the main drive machine. Since this auxiliary generator only operates in a relatively short time, it can provide a high extra charge and thus deliver substantial current for its size. However, the possibilities for this arrangement are limited because the main machine which assures the drive of the vehicle is generally a machine having series excitation which is relatively impractical to control. These machines are thus utilized separately and the inertia of the assembly is substantial.

SUMMARY OF THE INVENTION

An object of the present invention is to provide an energy exchanger apparatus for electrical vehicles comprising two machines connected on the same shaft to assure three functions which include: drive; recovery of energy; and charge of the battery from an external electrical feed source whose voltage is, in general, higher than that of the battery. The functions of energy recovery and recharge of the battery only differ by the nature of the supplied energy but have the same final result, i.e. the recharge of the battery by control of the charge voltage and current.

Another object of the present invention is the ability to increase the utilization of the two machines and to utilize them simultaneously either as motors or as generators and to assure a better control.

Another object of the present invention is to allow the vehicle to be operated entirely by the energy furnished from an external source.

Another objective of the present invention is to increase the coefficient of utilization of the electric motor of the vehicle and to obtain a total weight which is less than that of an arrangement whose operations are entirely separated.

According to the present invention, the above-noted objectives are attained by mounting on the same drive shaft two rotatable electrical machines each capable of operating as a motor or a generator, these machines being able to exchange energy between one another and the batteries of the vehicle.

The invention will be better understood by means of the detailed description of one embodiment given by way of non-limitative example and illustrated in the attached drawing.

BRIEF DESCRIPTION OF THE DRAWING

FIG. 1 is a diagrammatic illustration of the energy exchanger according to the present invention and in which the energy exchange between the different portions of the apparatus and the external electrical feed source is shown, and, FIG. 2 is a schematic electrical diagram showing the principle of operation of the apparatus according to the invention.

DETAILED DESCRIPTION

In the diagrammatic illustration in FIG. 1, reference numeral 1 designates an external electrical feed source such as the electrical power mains of a city power supply. The power supply 1 delivers energy during periods of charge to the machine 2 referred to as a charge or recovery machine connected on the same shaft as a machine 3 referred to as the main drive machine for the vehicle. These machines 2 and 3 exchange energy between themselves and with the battery 4 through the intermediary of a control system 5.

The output shaft of the main drive machine 3 is designated by reference numeral 6. It is connected to the wheels of the vehicle. A disconnectable coupling 7 is optionally inserted between the two machines 2 and 3. This coupling which complicates the construction of the apparatus, is only employed in a number of limited cases, for example, where it is desired to have at all times, a low rotatable inertia of the machine 3.

Between each of the elements 2, 3, 4, 5 the exchange of energy is made in two directions as diagrammatically shown by the arrows in FIG. 1. The function of this assembly is only possible if the shaft 6 of the motor 3 can be disconnected from the wheels for charging from the electrical mains when the vehicle is at rest.

In the schematic diagram of FIG. 2, there is shown the same elements as in FIG. 1 with the same reference numerals, namely, the electrical mains 1, the small high-voltage machine 2, the low-voltage main machine 3, the batteries 4, and the coupling 7. A rectifier block 8 is interposed between the mains 1 and the control assembly 5 which represents the remainder of FIG. 2.

The electrical mains 1 whose voltage can be AC or DC is connected during periods of charging to rectifier block 8 of double alternation type, preferably three-phase. The positive terminal 9 of the rectifier 8 is connected to one of the ends of a series excitation coil 10a of the machine 2, the other extremity of the coil 10a being connected to the positive brush 11 of rotor 12. The negative terminal 13 of the rectifier 8 is directly connected to the negative brush 14 of the rotor 12 of machine 2. The machine 2 also comprises a separate excitation coil 10b of low voltage and high consumption for obtention of a high induced flux.

The change over of the machine 2 between the operations of recharging the battery 4 from the mains 1 and vehicle drive is realized by means of a triple switch 15 having three switching circuits designated by 16, 17 and 18 respectively. The position for the charging of the battery 4 is that in which the three blade contacts of circuits 16, 17 and 18 are directed to the left in FIG. 2. Then, only the circuit 18 is closed and its blade contact rests on contact 19 thus connecting the coil 10b to the positive terminal of the battery 4 through the intermediary of two resistors 21 and 22 connected in series, their point of juncture being designated by 23.

The drive function is effected when the contact blades of switch 15 are directed to the right in FIG. 2. The contact blade of circuit 18 then rests on contact 24 and connects the coil 10b to another switch 25 activated by the brake pedal 26 and the accelerator pedal 27 of the vehicle. Switch 25 is closed either when the brake pedal 26 is actuated or when the accelerator pedal 27 is either pushed to the floor or is completely released. The switch 25 should be taken in a symbolic sense as it can represent, if necessary, a function more complex than a simple switch.

The other contact of the switch 25 is connected to the output 28 of an electronic chopper 29 which is itself connected on the one hand to the positive terminal 20 of the battery 4 and on the other hand to the intermediate juncture 23. This chopper is therefore controlled by the voltage difference existing at the terminals of the resistor 22 which is connected between the positive terminal of battery 20 and juncture 23 and the chopper is also controlled by the position of the accelerator pedal 27 and the brake pedal 26.

The principal function of the chopper 29 is to feed the separate excitation coil 30 of the main low voltage machine 3. When the switch 25 is closed, the chopper 29 also feeds the separate excitation coil 10b of the machine 2. The other extremity of the coil 30 is connected to the negative terminal 31 of the battery 4.

The difference of potential existing at the terminals of resistor 22 is principally due to the current from the rotor 32 of the machine 3. The positive brush 33 of the rotor 32 is connected to the juncture 23 via an electric power chopper 34 also controlled, like the chopper 29, by the brake pedal 26 and the accelerator pedal 27 of the vehicle.

The negative brush 35 of the rotor 32 is connected to the negative terminal 31 of the battery 4. The negative brush 14 of the rotor 12 is also connected to the negative terminal 31 of the battery 4 via the circuit 16 of switch 15 when the latter is in the position of drive or charge (the contact blades are directed to the right in FIG. 2).

The contact blade 17 of the switch 15, in its drive position, connects the positive brush 11 of the rotor 12 via diode 36 to the intermediate or juncture point 23. The cathode of the diode 36 is directed towards the intermediate point 23. A second diode 37 connects the positive brush 33 of the rotor 32 to the same intermediate point 23, its cathode also being directed towards the juncture point 23.

A third diode 38 connects the brush 33 to the series excitation coil 10a of the machine 2 through a switch 39. The circuit comprising the diode 38, the switch 39, the coil 10a, the rotor 12, the brush 14, the contact blade 16 of switch 15 provides for the operation of machine 2 at starting of the vehicle therefore to increase the available torque. It is possible to couple, under these conditions, the winding 10a to the excitation of the machine 2 notably in the case where the operator fully depresses the accelerator 27 which closes the switch 25.

In a modification, the switch 39 can be connected directly to the brush 11 of the rotor 12, the coil 10a then being non-utilized, the coil 10b acting alone for excitation at starting. The coil 10a will thus be employed only for recharging the battery 4 from the electrical mains 1. The connector 40 directly connected to the terminals 20 and 31 of the battery 4 permits its recharge from a suitable source when it is completely discharged.

The operation of the exhanger apparatus according to the invention will now be briefly described.

At the time of charging of the battery 4 from the mains 1, the three switch circuits 16, 17 and 18 of switch 15 are turned to the left manually or automatically while the switch 39 is opened.

With the exception of the coil 10a, the machine 2 is electrically insulated from the remainder of the apparatus. Subject to good insulation of the machine 2, the risk of accidentally connecting one point of the vehicle to the electrical supply mains is very small. Therefore, a good safety measure is provided for persons operating this apparatus.

If necessary, and if the speed of the machine 2 need not be regulated according to the voltage of the mains, the coil 10b can also be disconnected from the battery 4 and the rest of the installation by a switch (not shown).

The rectifier 8 permits feeding the machine 2 from external source 1 of AC current either single phase or three phase of usual voltage value. At the time of energization, the machine 2 produces a relatively small draw of current thanks to the series coil 10a.

In the ordinary case of use, the coil 10b is fed via the resistors 21 and 22 from the battery 4 assuming no complete discharge. By changing the value of the resistor 21 according to the voltage of the mains, it is possible to obtain a certain regulation of the speed of the machine as a function of the supplied current. The assumption that the battery is not totally discharged is not unreasonable because it is recommended that it not drop below a discharge level of 80 per cent.

The rotor 32 is driven by the rotor 12 and furnishes a charge current for the battery 4 through the diode 37 and the resistor 22 subject to an appropriate feed of the coil 30 through the excitation chopper 29. The diode 37 prevents return of current from the battery 4 to the rotor 32.

The chopper 29 is controlled as a function of the current passing in the resistor 22 and as a function of the voltage of the battery 4. There is obtained therefore a relation of the charge in E and I which gives the best results with respect to speed of charge and of duration of life of the battery. The chopper 34 when bivocal can replace the diode 37 whose function will thus be seen as symbolic.

In drive position of the switch 15, the contact blades 16, 17 and 18 are turned to the right and the feed source 1 is disconnected.

The machine 3 furnishes a drive torque which is a function of the position of the accelerator 27 and the brake 26 through the intermediary of chopper 29 and 34 which operate in conventional manner. Those skilled in the art will find it suitable to make the excitation current proportional to the rotor current and to diminish this excitation when the speed of the machine increases.

When the switches 25 and 39 are closed, the machine 2 is in drive condition, one or the other of the coils 10a or 10b being optionally disconnected according to whether there is used a machine of predominantly series or shunt construction.

The torque added by the machine 3 to that of machine 2 is relatively low except at the beginning of travel since the rotor 12 has been wound to furnish a high voltage. The machine 2 very rapidly reaches the condition in which it consumes little current.

In the condition of energy recovery, that is when the accelerator has been released or during brakage, the switch 25 is closed and the excitation currents of the coils 30 and 10b are raised to a high value due to the chopper 29. The voltage at the terminals of the rotors 12 and 32 therefore increases and current is supplied to the battery 4 via the diodes 36 and 37, the total value of the charge current measured at the terminals of the resistor 22 being controlled, as for the charge by the mains 1, by the chopper 29 feeding the separate excitation coil 30, but while having more elevated values of current and of voltage.

When the speed of the vehicle has decreased, the voltage furnished by the machine 3 is no longer sufficient and only the machine 2 furnishes current to the battery 4.

The operation of the switches 25 and 39 can also be associated with the speed of the vehicle, the machine 2 only operating at low speeds. It could therefore be useful to decouple the machine 2 from the machine 3 by automatically opening the coupling 7 to reduce the inertia.

Without departing from the framework of the invention, the machines 2 and 3 can be of synchronous or asynchronous AC type, the excitation and rotor coils optionally being combined along with the corresponding decouplers according to known techniques.

According to another embodiment, during a portion of the travel of the vehicle, for example on a live track, the machine 2 continues to receive electrical energy from the mains, the machine 3 then functioning either as a generator or as a motor according to the current value supplied to the excitation coil 30. The energy received or transmitted by the machine 3 can also be zero.

It is noted that in all cases of operation described with reference to FIG. 2, the only switches through which substantial current passes are those of the blade contacts 16 and 17 which are only manipulated at rest. The switch 39 is the one most highly fed with current of the other contacts, but it is only reaversed by a fraction of the starting current furnished by the battery 4 as the machine 2 presents a greater impedance than that of the machine 3.

What is claimed is:

1. An energy exchanger for an electrical vehicle comprising battery means including a first high voltage D.C. rotatable electrical machine with a series excitation coil and a separate excitation coil; a second low voltage D.C. rotatable electrical machine with a separate excitation coil; means for mechanically coupling both said electrical machines with each other and means for coupling both machines with the vehicle's wheels; means for connecting said first machine to an external electrical supply source during battery charging periods; first chopper means for supplying a variable current to said separate excitation coils from said battery; second chopper means for supplying a variable current to the rotor of said second machine and to said series excitation coil; switch means for connecting the separate excitation coil of said first machine to said first chopper means during vehicle drive periods, and connecting said coil to the battery during charging or regenerative periods.

2. An energy exchanger according to claim 1 including means for controlling said first and second chopper means by accelerator and brake pedals, said first chopper means being also controlled as a function of the battery current and as a function of the battery voltage.

3. An energy exchanger according to claim 2 including a switch, said first chopper means being connected to the separate excitation coil of said first machine through said switch, said switch being closed either when the brake pedal is actuated or when the accelerator pedal is either pushed to the floor or is completely released, or when the vehicle's speed is lower than a predetermined value.

4. An energy exchanger according to claim 3 including a diode and an auxiliary switch, said second chopper means being connected to the series excitation coil of said first machine through said diode and said auxiliary switch, said auxiliary switch being closed when the vehicle's speed is lower than a predetermined value.

5. A energy exchanger according to claim 4 wherein the coupling between both machines is automatically released, only said first machine being driven by the vehicle's wheels when the vehicle speed is lower than a predetermined value.

6. An energy exchanger according to claim 5 wherein during vehicle drive periods on a live track, said first machine is connected through said connection means to an external electrical supply, said second machine functioning either as a generator or as a motor, or being neutral dependent to the current value supplied to its excitation coil.

* * * * *